United States Patent [19]

Viertel et al.

[11] Patent Number: 5,011,212
[45] Date of Patent: Apr. 30, 1991

[54] SUN VISOR AND SUPPORT STRUCTURE FOR MOTOR VEHICLES

[75] Inventors: Lothar Viertel, Altforweiler, Fed. Rep. of Germany; Patrick Welter, Lachambre, France

[73] Assignee: Gebr. Happich GmbH, Fed. Rep. of Germany

[21] Appl. No.: 435,031

[22] Filed: Nov. 9, 1989

[30] Foreign Application Priority Data

Nov. 10, 1988 [DE] Fed. Rep. of Germany ....... 3838117

[51] Int. Cl.$^5$ .............................................. B60J 3/00
[52] U.S. Cl. .................... 296/97.9; 160/370.2; 296/97.5; 362/74; 362/140; 362/141; 362/144
[58] Field of Search ............... 296/97.1, 97.5, 97.9, 296/97.12, 97.13; 160/DIG. 3, 370.2; 362/74, 140, 141, 144, 135

[56] References Cited

U.S. PATENT DOCUMENTS

| 2,416,761 | 3/1947 | Le Lande ................... 296/97.9 |
| 3,343,867 | 9/1967 | Couch et al. ................ 296/97.9 |
| 3,825,296 | 7/1974 | Peterson ..................... 296/97.13 |
| 4,369,996 | 1/1983 | Fluck ......................... 296/97.9 |
| 4,428,612 | 1/1984 | Viertel et al. ............... 296/97.12 |
| 4,610,477 | 9/1986 | Ebert et al. ................. 296/97.12 |
| 4,620,742 | 11/1986 | Gavagan ..................... 296/97.9 |
| 4,664,435 | 5/1987 | Dietz et al. ................ 296/97.9 X |
| 4,683,522 | 7/1987 | Viertel et al. ............... 362/140 X |
| 4,686,609 | 8/1987 | Dykstra et al. ............. 362/141 X |
| 4,696,510 | 9/1987 | Zwirner ...................... 296/97.13 |
| 4,760,500 | 7/1988 | Peng .......................... 362/74 |
| 4,888,072 | 12/1989 | Ohlenforst et al. ......... 296/97.9 X |

FOREIGN PATENT DOCUMENTS

| 180700 | 5/1986 | European Pat. Off. ........... 296/97.9 |
| 275903 | 7/1988 | European Pat. Off. .......... 296/97.12 |
| 2703447 | 8/1978 | Fed. Rep. of Germany . |
| 2730926 | 1/1979 | Fed. Rep. of Germany ..... 296/97.9 |
| 2919929 | 11/1980 | Fed. Rep. of Germany ... 296/97.12 |
| 3136494 | 3/1983 | Fed. Rep. of Germany . |
| 3711570 | 10/1988 | Fed. Rep. of Germany ........ 362/74 |
| 3730346 | 3/1989 | Fed. Rep. of Germany ..... 296/97.9 |
| 1091316 | 4/1955 | France ......................... 296/97.5 |
| 1396360 | 3/1965 | France ......................... 296/97.9 |
| 527066 | 10/1957 | Italy .......................... 296/97.9 |
| 2177980 | 2/1987 | United Kingdom ............... 362/74 |

Primary Examiner—Margaret A. Focarino
Assistant Examiner—Andrew C. Pike
Attorney, Agent, or Firm—Ostrolenk, Faber, Gerb & Soffen

[57] ABSTRACT

A sun visor includes a sun visor body. A swivel mounting block and an outer support block, which respectively receive a swivel arm from one end of the visor body and a support part from the other end of the visor body, are joined by and are one piece with a connecting member which bridges over at least a part of the sun visor body and is disposed above the upper longitudinal edge of the visor body. The connecting member is also in one piece with a housing for an electrical illuminating unit and has an illumination window.

3 Claims, 1 Drawing Sheet

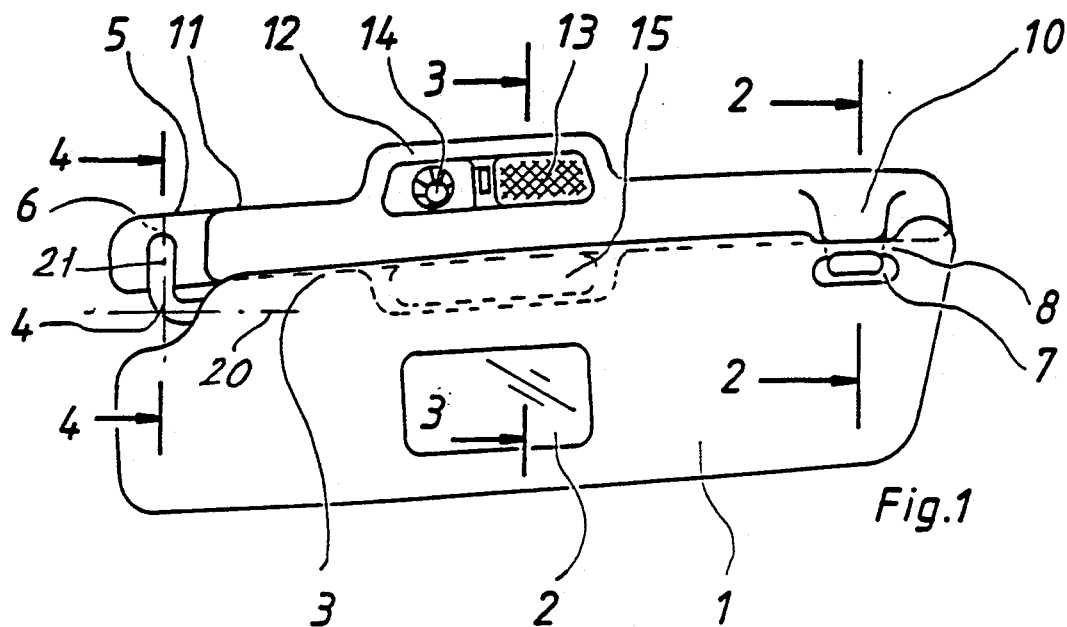
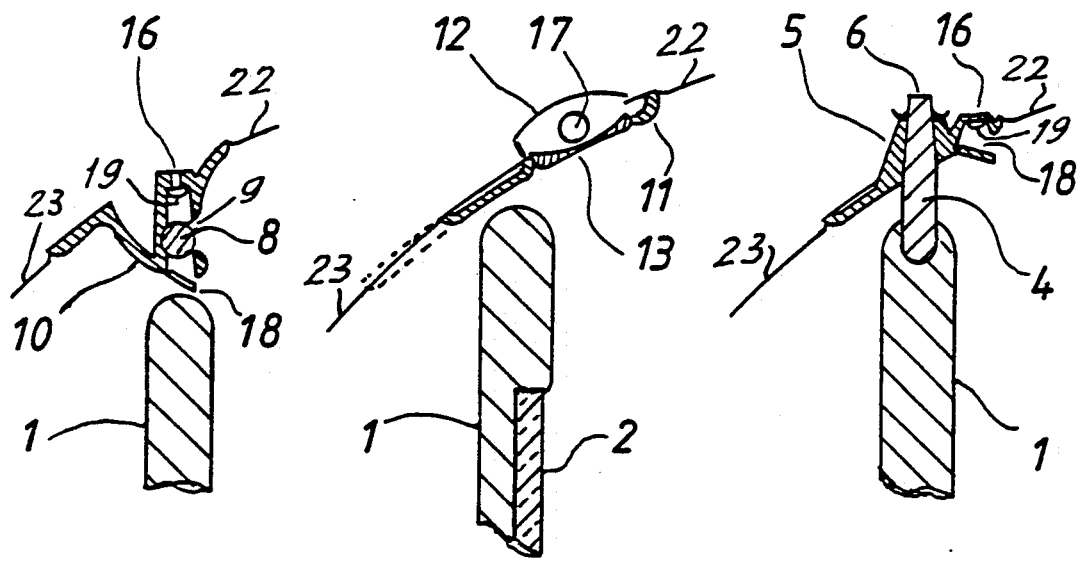

SUN VISOR AND SUPPORT STRUCTURE FOR MOTOR VEHICLES

BACKGROUND OF THE INVENTION

The present invention relates to a sun visor and support structure for motor vehicles.

Prior Art

A typical prior art sun visor comprises a sun visor body, a swivel mounting block on the vehicle body for providing its support toward one side end of the visor body and an outer support block also on the vehicle body for providing its support toward the other side end of the visor body. The sun visor body has, in the region of its upper longitudinal edge and at one side end, a swivel mounting shaft including a shaft arm which protrudes from the sun visor body and is received in the swivel mounting block. In the region of the upper longitudinal edge and toward the other side end the sun visor body has an outer support shaft which can be detachably engaged into the mounting receiver of the outer support block.

A sun visor of this type is disclosed, for instance, in Federal Republic of Germany Application OS 27 03 447, corresponding to U.S. Pat. No. 4,174,864 or in Federal Republic of Germany Application OS 27 30 926, corresponding to British Patent 1,579,319.

Although such sun visors have proven satisfactory and usable in practice, it has been found that the manufacture of such sun visors and their mounting still present difficulties and inadequacies, particularly due to the multi-part construction of the present sun visors. For instance, the swivel mounting block and the outer support block may be separately manufactured and be held in stock or inventory to be mounted as needed. The separate manufacture requires different manufacturing tools and also presents a difficulty of color matching, since customers naturally require that there be the same color present through the entire visor and particularly, for instance, for the swivel mounting block and the outer support block. This entails difficulty in ordering and maintaining of stock. Further, the multi-part construction of traditional sun visors constitutes a disadvantage on assembly into a vehicle. Particularly if there are deviations in tolerance in the receiving parts of the vehicle body, the swivel mounting block and the outer support block may no longer be aligned precisely with the swivel mounting shaft so that unimpeded pulling out and reinsertion of the outer support shaft from and into the mounting receptacle of the outer support block is no longer possible or is difficult.

SUMMARY OF THE INVENTION

Accordingly, the object of the present invention is to simplify the manufacture and mounting as well as to reduce the number of parts of a sun visor body.

In the invention the swivel mounting block is a structural part of and is combined as one piece with the outer support block by means of a connecting member which bridges over at least a part of the sun visor body. Preferably, such single piece will be formed as a plastic injection molding. Any problems with respect to color matching are avoided. In addition, the stocking of parts and their mounting and assembly are substantially simplified. That single piece is typically affixed inside the roof of the vehicle body above the visor body, and the visor body swivels up and down with respect to that piece.

In a further development of the present invention, the one piece structural part includes a housing that is developed or constructed in one piece to receive an electric illuminating unit which is provided on its front with at least an opening for an illumination window, a lens, or a similar structure. In this connection, the structural part may have a substantially rectangular contour where a widened area forms a housing and lies in the central region. In that case, the front side of the connecting member, which joins the swivel mounting block and the outer support block, and the front side of the housing lie approximately in the same plane. This provides a particularly advantageous combination of parts which otherwise would be manufactured and mounted separately, and also substantially simplifies the manufacture of the sun visor body so that it is now possible to dispense with the complicated insulation of an illuminating unit.

The sun visor body need merely be equipped in addition with a mirror, which is generally desired in present structures. The arrangement of the illuminating device in its structural part or connecting member arranged above the sun visor, which now also includes the mounting blocks, has a particular advantage and overcomes the difficulties which previously existed in connection with the provision of an illuminating device in the sun visor body. In addition to the substantially simplified supply of electricity, the mirror which is customarily provided on the sun visor body can now be used without light from the lamp on the visor dazzling the driver or other vehicle occupant because there is a relatively large distance present between the source of light and the mirror which is seated on the sun visor body. The illuminating device also affords the possibility of dispensing with a separate interior light for the vehicle as is otherwise customary. This is particularly the case if, in accordance with a further development of the present invention, the vertical widening of the central portion of the connecting member, which forms the housing, is arranged or developed so that an illumination window region extends over the mounting side longitudinal edge in the sun visor body. This last structure may be present regardless of whether the sun visor body is in its position of use in front of the windshield, or in its position of non-use resting against the inner side of the roof.

Thus, while the first structure may appear to be similar to prior structures, the arrangement of the separate parts in such a manner that they must be assembled in only one way in order to provide a complete sun visor and the arrangement of the individual parts so that they will necessarily match in the proper way becomes quite useful.

BRIEF DESCRIPTION OF THE DRAWINGS

The foregoing and other objects and features of the present invention will be explained in further detail with respect to the drawings in which:

FIG. 1 is an overall view of a sun visor provided with the invention.

FIG. 2 is a sectional view taken along the line 2—2 of FIG. 1.

FIG. 3 is a sectional view taken along the line 3—3 of FIG. 1.

FIG. 4 is a sectional view taken along the line 4—4 of FIG. 1.

DETAILED DESCRIPTION OF THE INVENTION

Referring to the drawings, the sun visor includes of a flat sun visor body 1 of approximately rectangular contour. On one of its broad sides, the body 1 supports a mirror 2, which can be viewed when the sun visor body 1 is in its downward swung position of use. In the region of its upper longitudinal edge 3, the sun-visor body 1 has at one end an L-shaped swivel mounting shaft 4 with a shaft arm 6 that extends out of and up from the sun visor body and is received by a swivel mounting block 5 fixed on the vehicle body 22. The body 10 is respectively rotatable about first and second axes 20 and 21 which are substantially perpendicular to one another and which pass through the arm 4. At the other end, the visor body has an outer support shaft 8, which passes across a recess 7 defined in the sun visor body 1. The shaft 8 can be detachably engaged in the mounting receiver 9 of an outer support block 10 also supported on the vehicle body. The visor body may be swiveled up and down relative to the blocks 5 and 10.

As shown in FIG. 1, the swivel mounting block 5 is developed, via a connection member 11 which bridges substantially over the sun visor body 1, as a structural part which is combined in one piece with the outer support block 10. That part is comprised of a plastic injection molding. The combined part 5, 11, 10 is affixed inside the roof of the vehicle, in the passenger compartment above the window 23 to be selectively covered by the sun visor.

In its central region, the connecting member 11 is widened in height to form a housing 12. Preferably, the housing 12 is angled downwardly, as shown in FIG. 3, to direct light downwardly toward a passenger in the vehicle seat facing the housing. On its front the housing 12 has an illumination window 13, a reading light 14, and the like. The housing 12 is formed integrally with the connecting member 11 and, as best seen in FIG. 3, the housing and the connecting member each have planar surfaces facing rearwardly which lie in substantially the same plane. The housing receives an illuminating device having a light source 17 which can be connected with the electric current supply of a vehicle. Although the housing 12, as shown in solid line, widens the connecting member 11 in an upward direction, alternatively a downwardly directed widening can also be provided which forms a housing 15, indicated by a dash-dot line. A source of light having a light window located in front of it can also be provided in the housing 15.

FIGS. 2 and 4 show mounting openings 16 in the member 11 for receiving fastening elements 19. The mounting openings 16 can be closed by respective covers 18 which can be snapped into closed position.

In addition to its simplicity of manufacture and mounting, the new sun visor also is of pleasing appearance and it can be supplied as a completely preassembled sales unit. No problems are present any longer with respect to color matching. Furthermore, the stocking, and in particular the mounting, are substantially simplified.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sun visor and support structure for a motor vehicle, which comprises:

a sun visor body having a longitudinal edge extending from a first side edge of the body to a second, opposed side edge, the sun visor body further having a recess defined in the longitudinal edge adjacent to the second side edge and a bore substantially parallel to the longitudinal edge and disposed adjacent to such longitudinal edge;

a support shaft extending across the recess approximately parallel to the longitudinal edge and connected at the ends thereof to the sun visor body;

an L-shaped arm having a first portion rotatably received within the bore of the sun visor body and having a second portion extending substantially perpendicular from the first portion; and an elongated support member adapted to be mounted over a front windshield of the motor vehicle and having a length approximately equal to a length of the longitudinal edge of the sun visor body, the support member having an integral bracket at one end for rotatably receiving the second portion of the L-shaped arm so that the sun visor body may rotate about a first axis passing through the second portion and having an integral bracket at another end for detachably and rotatably receiving the support shaft so that the sun visor body may rotate about a second axis which is substantially perpendicular to the first axis and which passes through the first portion of the L-shaped arm.

2. A sun visor as in claim 1, further comprising a housing for a light formed integrally with the support member and positioned approximately midway between the ends of such support member.

3. A sun visor as in claim 2, wherein the housing is angled such that, when the support member is attached over the front windshield of the motor vehicle, light is directed downwardly and rearwardly and wherein the support member and the housing each have planar surfaces facing rearwardly which lie in substantially the same plane.

* * * * *